R. B. GLIDDEN.
WATERING APPLIANCE.
APPLICATION FILED APR. 19, 1919.
1,429,584.
Patented Sept. 19, 1922.
2 SHEETS—SHEET 1.
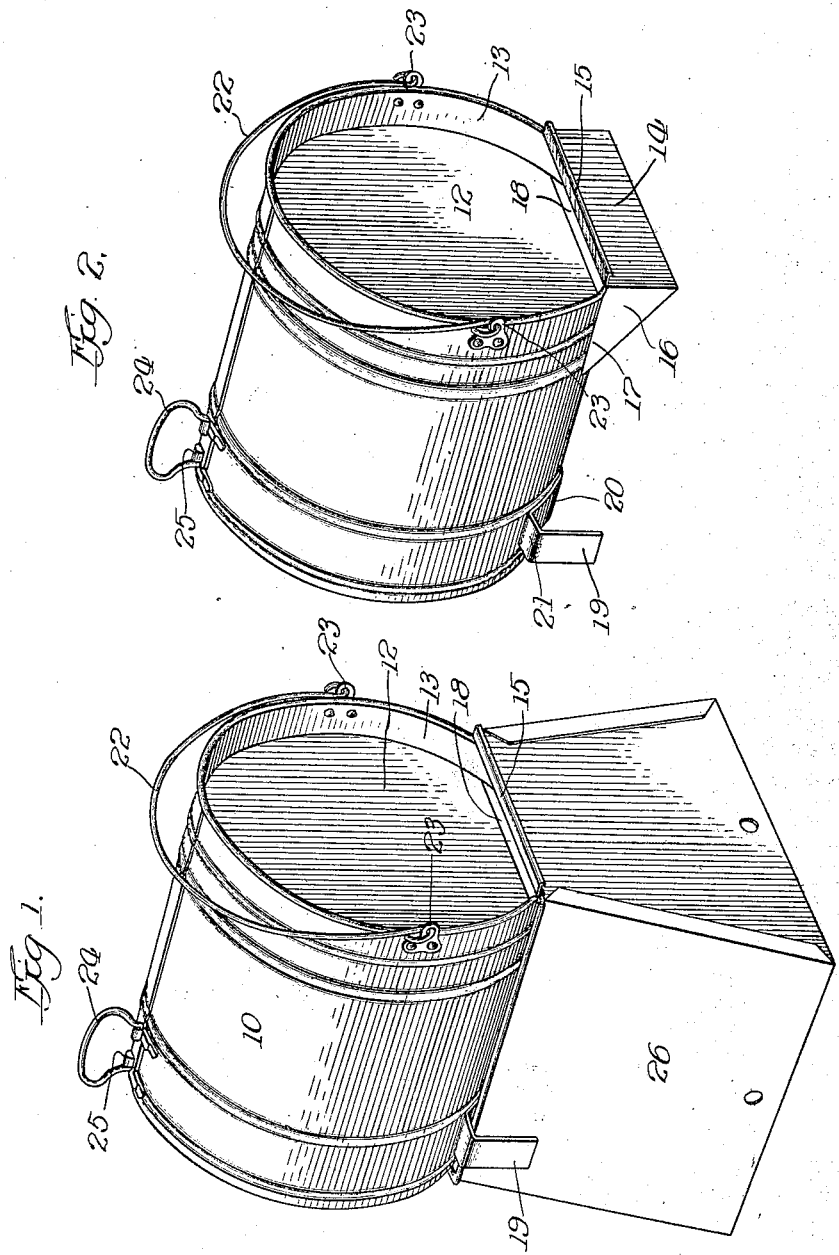

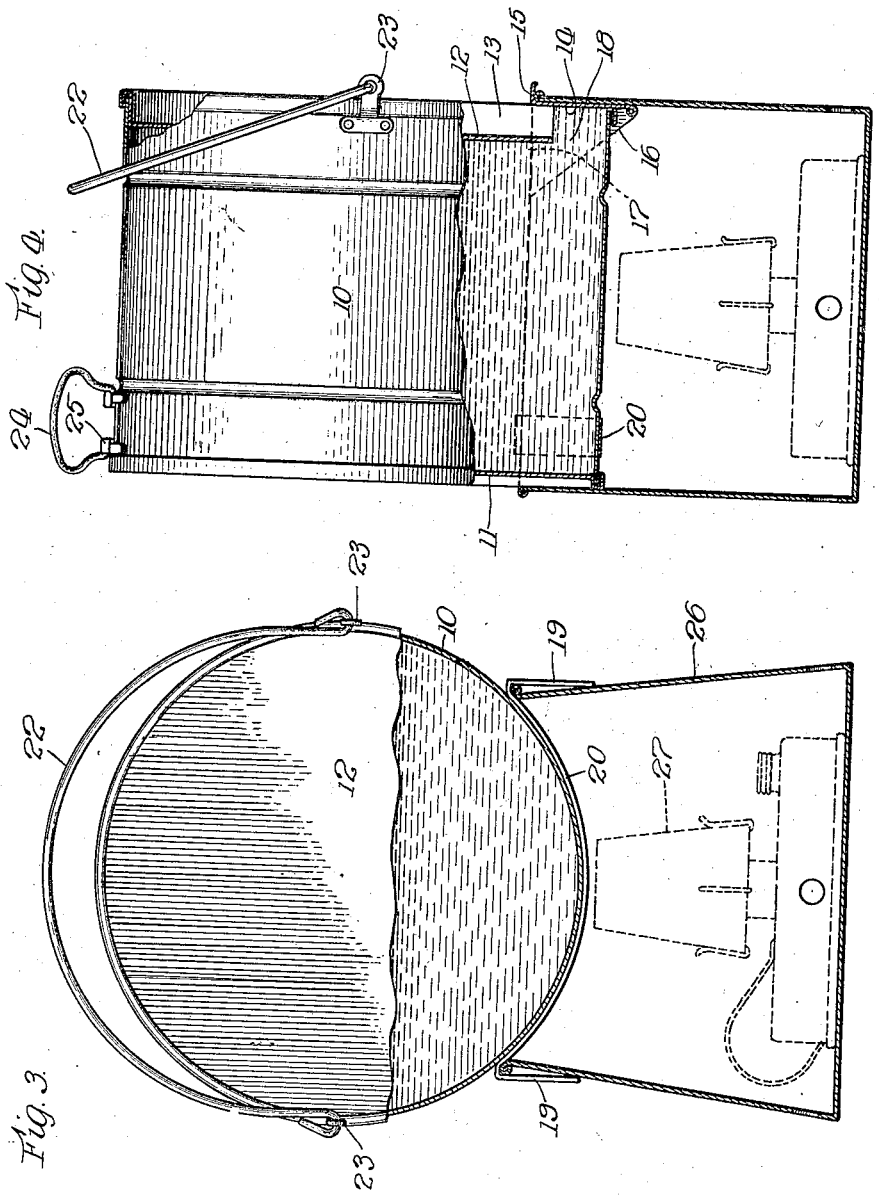

Patented Sept. 19, 1922.

1,429,584

UNITED STATES PATENT OFFICE.

RAYMOND B. GLIDDEN, OF KEWANEE, ILLINOIS, ASSIGNOR TO KEWANEE IMPLEMENT COMPANY, OF KEWANEE, ILLINOIS, A CORPORATION OF ILLINOIS.

WATERING APPLIANCE.

Application filed April 19, 1919. Serial No. 291,303.

*To all whom it may concern:*

Be it known that I, RAYMOND B. GLIDDEN, a citizen of the United States, residing at Kewanee, in the county of Henry and State of Illinois, have invented certain new and useful Improvements in Watering Appliances, of which the following is a specification.

My invention pertains to features of novelty and improvement in watering appliances, especially, but not restrictedly, to devices of this general type or character adapted and intended for the dispensing of water to fowls, but its principles of construction are also capable of use on a larger scale for the watering of farm stock or other animals. One main and prime object of the invention is the production or provision of a watering apparatus which can be easily handled for refilling, which can be carried readily to the place of filling, which can be used in summer without heat, and which in winter can have heat applied thereto. In addition, a further purpose of the invention is the design of such a structure that it is easy and cheap to manufacture, simple and compact in construction, unlikely to be injured or damaged in ordinary use or service, and which may be handled with facility.
To the accomplishment of these and other desirable ends the preferred embodiment of the invention comprises a tank having an inset head, a marginal rim projecting beyond said head, an outer wall fitted to said rim and forming a trough therewith, the head being cut away in register with the outer wall of the trough to permit the flow of water to the latter and to permit refilling, the device having legs or supports whereby it may rest on the ground or be fitted to the top of an open casing or housing containing a heating element, such as a lamp. To aid in the carrying of the tank and its replacement on the ground or over the heater, it is equipped with two handles at its opposite ends, the one at the trough end being a bail permitting the tank to be carried in upright position as a bucket or pail.

In order that those skilled in this art may understand the structural and functional advantages accruing from the employment of the invention I have illustrated a preferred and desirable embodiment of the same in the accompanying drawings forming a part of this specification and throughout the various views of which like reference characters refer to the same parts, but it is to be understood that the invention is not limited and restricted to the precise and exact structural features shown and described because these may be varied within comparatively wide limits without departure from the heart and essence of the invention and without the sacrifice of any of its substantial benefits and advantages.

In these drawings:

Figure 1 is a perspective view of the whole appliance mounted on the casing or housing enclosing the heating lamp or stove;

Figure 2 shows how the combined tank and trough are used without the casing when the employment of heat is not necessary;

Figure 3 is a vertical cross-section through the device with certain parts shown in full lines; and

Figure 4 is a side view of the same with a portion of the structure broken away to more clearly indicate the details of construction.

Referring to the drawings it will be seen that the improved appliance comprises a cylindrical water-supply tank or reservoir 10 having a bottom 11 and a top or head 12 set in somewhat from the corresponding edge of the round side wall, thus providing an outwardly-extending circular rim 13 projecting beyond such head. Secured as by soldering or otherwise to the edge of the rim is a substantially rectangular metal plate 14 having along its top margin an outwardly-extended lip or flange 15 and at its two ends triangular-shaped braces 16 provided by bending such shaped integral parts of the plate rearwardly at right angles thereto, that is, longitudinally of the tank, the top edges 17 of such braces being soldered or otherwise secured lengthwise of and to the outer surface of the tank side-wall. Back of such front wall 14 of the trough the head is omitted or cut away leaving a segment-shaped opening 18 through which the water may flow from the tank to the trough on the well-known barometric principle, the straight top edge of such aperture being slightly below the corresponding edge of the trough front wall 14. Substantially in line or register with these triangular braces 16 at the other end of the tank I fasten to the latter supporting legs 19, 19 soldered or otherwise secured to the outer face of the tank by their curved connecting band 20, intermediate horizontal sections 21, 21 connecting the legs proper with such strap or band. These legs are of such length that when the tank is deposited in horizontal position on a smooth surface it will be supported by the bottom edge of the trough element 14 and the two legs 19, 19.

To render the carrying and manipulation of the tank easy its rim part 13 is equipped with a hinged handle or bail 22 secured thereto by a pair of ears 23, 23 arranged parallel to the top edge of the trough, and a handle 24 fastened to the outer surface of the tank desirably by a hinge arrangement 25, such handle conveniently being disposed lengthwise the tank and midway between ears 23, 23 so that the two handles are right angles to one another and located near opposite ends of the tank.

In summer time when no heating of the water is required to keep it from freezing the tank rests on the ground being supported and prevented from rolling by the trough front-wall and the two rear legs. Thus the fowl has ready access to the trough the water in which is automatically replenished from the tank as it is consumed or evaporated. When the supply-tank requires refilling, it is merely picked up by the bail and carried as an ordinary pail or bucket. The water is pumped or otherwise delivered onto the head 12, which with the rim constitutes a shallow chamber, from which it at once flows through the aperture 18 into the tank or reservoir, and, when sufficiently replenished in this manner, it is carried by the bail to the place of use. With the aid of the other handle 24 it is turned over horizontally, trough down, of course, as is easily determined by the position of such handle, and deposited on the ground, the bail being swung back as shown in Figure 2, for example, so as not to interfere with access to the trough.

When the weather is sufficiently cold to make the heating of the water desirable I provide a sheet-metal casing or housing 26 containing a lamp or stove 27 and having an open top rectangular in shape and of a size adapted to receive the lower part of the tank and the trough. The tank is placed on this housing projecting downwardly thereinto and being supported by the edges of the latter which engage the curved surface of the tank. When thus deposited on or partially in this casing or housing the trough of the tank is also in such housing as well as the end braces 16, 16 with the lip 15 of the trough projecting forwardly just above the edge portion of the housing and the legs 19, 19 extend out or fit over the longitudinal edges of the casing and then downwardly as shown. Obviously, the lamp or stove below the tank in such casing heats the water not only in the reservoir but also that in the trough thus preventing its freezing. By providing the two handles specified in the relation stated the combined tank and trough can be readily placed in position on the housing or on the ground and can be carried about for refilling with water.

From an understanding of this construction and its mode of operation it will be appreciated that the appliance is not only simple in structure but is economical to manufacture and is easily handled without danger of breakage or damage in ordinary service.

I claim:

1. In a watering-appliance of the character described, the combination of a cylindrical water-supply tank having an apertured head disposed inwardly away from the corresponding circular edge of the tank, a wall across said edge in register with the aperture of the head forming a trough with said head and that portion of the tank sidewall between them, said trough wall extending beyond said tank edge and constituting a supporting foot for the tank, brace ends of said wall being bent lengthwise the tank and secured to its outer face, the top edge of said wall having an outstanding flange or lip, a bail handle hinged to the trough end of the tank in parallel relation to the trough, a second handle secured to the other end of the tank disposed at right angles to the trough, a plurality of supporting legs at the end of the tank opposite the trough, and a housing adapted to contain a heating appliance and having a rectangular top opening, said tank being adapted to rest on said supporting foot and legs or be mounted on said housing with said trough wall and its brace ends accommodated in said housing, the flange of the wall overlying the corresponding edge of the housing, substantially as described.

2. In a watering-appliance of the character described, the combination of a cylindrical water-supply tank having an apertured head disposed inwardly away from the corresponding round edge of its side-wall, and a sheet-metal wall across and bearing on said edge in register with the aperture of the head forming a trough with said head and that portion of the tank between them, said wall extending beyond said tank edge and constituting a supporting foot for the tank, brace ends of said wall being bent lengthwise the tank and secured along their top edges to its outer face.

3. In a watering-appliance of the character described, the combination of a cylindrical water-supply tank having an apertured head disposed inwardly away from the corresponding circular edge of the tank, a wall across said edge in register with the aperture of the head forming a trough with said head and that portion of the tank side-wall between them, said trough wall extending beyond said tank edge and constituting a supporting foot for the tank, the top edge of said wall having an outstanding lip, and an open top housing having its top edges in a single plane and adapted to contain a heating appliance, said tank being adapted to rest on said supporting foot or be mounted on said housing with the tank projecting down into the open top of the housing with said trough wall accommodated inside of said housing and with the lip of said wall overlying the corresponding edge of the housing.

RAYMOND B. GLIDDEN.